United States Patent
Wang et al.

[15] 3,699,131
[45] Oct. 17, 1972

[54] PROCESS FOR PRODUCING VINYL GLYCIDYL ETHER FROM LOW BOILING ALKYL VINYL ETHERS

[72] Inventors: Ting I. Wang, Newtown Square, Pa.; Glenn M. Nakaguchi, Fullerton, Calif.

[73] Assignee: Atlantic Richfield Company, New York, N.Y.

[22] Filed: April 8, 1970

[21] Appl. No.: 26,793

[52] U.S. Cl. ............................................. 260/348 R
[51] Int. Cl. ............................................. C07d 1/18
[58] Field of Search ................................. 260/348 R

[56] References Cited

UNITED STATES PATENTS

| | | |
|---|---|---|
| 3,414,634 | 12/1968 | Sorkin...................260/348 R |
| 3,576,884 | 4/1971 | Russell...................260/614 R |
| 3,203,939 | 8/1965 | Tinsley et al. ............260/88.1 |

FOREIGN PATENTS OR APPLICATIONS

709,106    5/1954    Great Britain

OTHER PUBLICATIONS

Watanabe et al., Jour. Am. Chem. Soc. (1957) pp. 2,828– 2,833.

*Primary Examiner*—Norma S. Milestone
*Attorney*—Robert R. Cochran

[57] ABSTRACT

An improved process for producing vinyl glycidyl ether by means of the transvinylation reaction comprising passing methyl vinyl ether or ethyl vinyl ether through a solution of a mercuric compound catalyst and glycidol in a high boiling solvent at atmospheric or superatmospheric pressure and moderate temperature.

7 Claims, No Drawings

PROCESS FOR PRODUCING VINYL GLYCIDYL ETHER FROM LOW BOILING ALKYL VINYL ETHERS

BACKGROUND OF THE INVENTION

1. Field of the Invention

This invention relates to processes for producing vinyl glycidyl ether in a continuous process.

2. Description of the Prior Art

It has been proposed in U.S. Pat. No. 3,203,939 to Tinsley et al., Aug. 31, 1965 to prepare vinyl glycidyl ether from glycidol and higher boiling vinyl alkyl ethers such as vinyl n-butyl ether, vinyl 2-ethylhexyl ether, vinyl n-octyl ether and vinyl 2-butoxyethyl ether at moderate temperatures. However, the prior art required sub-atmospheric pressures which are not readily adoptable to a continuous type reaction and are relatively expensive requiring costly, special equipment. It has also been proposed to react glycidol and divinyl ether.

SUMMARY OF THE INVENTION

It has been discovered that the disadvantages of the prior art processes may be avoided by using a low boiling alkyl vinyl ether starting material, specifically, methyl vinyl ether or ethyl vinyl ether, and carrying out the reaction on a continuous basis by passing the low boiling alkyl vinyl ether through a solution of glycidol and catalyst employing certain high boiling solvents. It is, therefore, an object of this invention to provide a new and improved method for the preparation of vinyl glycidyl ether from glycidol.

It is a further object to provide a continuous and more economical process for producing vinyl glycidyl ether.

It is a still further objeCt to produce vinyl glycidyl ether without the necessity of employing sub-atmospheric pressures.

DETAILED DESCRIPTION OF THE INVENTION

These and other objects are accomplished by passing methyl vinyl ether or ethyl vinyl ether through a solution of a catalyst and glycidol in a high boiling solvent and recovering the vinyl glycidyl ether product from the solution. The excess alkyl vinyl ether starting material can be recovered in the vapor phase as a mixture with the methyl alcohol or ethyl alcohol by-product and thereafter separating and recycling the alkyl vinyl ether by cooling the gas mixture to a temperature intermediate the boiling points of the alkyl vinyl ether and the alcohol.

The catalyst employed is any mercuric salt. Preferred catalysts are mercuric salts of weak acids, for instance, a mercuric oxalate, mercuric citrate, mercuric linoleate, mercuric propionate, mercuric butyrate, mercuric chromate and mercuric acetate. The most preferred catalyst is mercuric acetate. The ratio of catalyst on a basis of moles of catalyst to moles of glycidol starting material is about 0.05 to about 0.5 with preferred ratio being from about 0.1 to about 0.25.

The solvent employed is any high boiling solvent adaptable to the reaction, and preferably boils above 130° C., suitable ones including t-butyl toluene, diglyme (diethylene glycol-dimethyl ether), benzonitrile, and adiponitrile and other nitriles. The most preferred solvent is benzonitrile. The glycidol to solvent ratios in this process are from about 0.2 to about 30 moles of glycidol per liter of solvent, preferably from 0.5 to about 10. Temperatures suitable are within 25° to 150° C. range with the most preferred temperature being from 55° to 100° C. The pressures suitable for the reaction are atmospheric and superatmospheric, with atmospheric to 5 atmospheres preferred. Sub-atmospheric pressures are outside of the scope of this invention. The continuous reactor equipment is well-known in the art and any standard flow reactor can be employed.

An optional aspect of the invention includes employing inert gas as a purge in order to remove the methyl or ethyl alcohol by-products of the reaction.

Suitable inert gases are nitrogen, methane, ethane, helium, and any others non-reactive with the reactants. This gas is passed through the reaction mixture at a rate of up to 40 liters per hour per liter of solvent.

The rate of purge can be up to 40 liters per hour per liter of solvent. While not desiring to be bound by any theory of operation, it is speculated that the advantages of the process may be attributable to the removal of the methyl alcohol or ethyl alcohol by-product as it is formed, thereby driving the reaction more toward completion.

The following examples are merely illustrative of the preferred embodiments of the novel process of this invention and are not intended to be limiting.

EXAMPLE I 0.06 moles $Hg(OAc)_2$, 0.3 moles of glycidol and 230 milliliters of benzonitrile were charged to a glass pipe reactor. The reaction mixture was heated to 80° C. and an inert gas purge of nitrogen at the rate of 8.3 liters per hour was begun. Methyl vinyl ether was bubbled through the reaction mixture at a rate of 17.1 liters per hour for 3 hours. The conversion of glycidol in mole per cent was 72 percent and the selectively of vinyl glycidyl ether in mole percent was 64 percent.

EXAMPLE II

The conditions of Example I were repeated except that the nitrogen purge rate was reduced to 3.5 liters per hour, and the conversion of glycidol obtained was 64 percent. However, the selectivity to vinyl glycidyl ether rose to 82 percent.

EXAMPLE III

The conditions of Example I were repeated except that there was no nitrogen purge and the methyl vinyl ether feed rate was increased to 24.4 liters per mole and run for only 2 hours. The conversion of glycidol was 75 percent and selectivity to vinyl glycidyl ether was 69 percent.

EXAMPLE IV

The conditions of Example III were repeated except that the methyl vinyl ether feed rate was increased to 26.6. The conversion of glycidol was 69 percent and selectivity to vinyl glycidyl ether was 72 percent.

EXAMPLE V

To determine the effect of catalyst concentration two reactions were performed at 80° C. for 2 hours with a methyl vinyl ether feed rate of 20.4 liters per hour into a solution of 0.3 moles of glycidol in 200 milliliters of benzonitrile solvent. The amount of mercuric acetate catalyst in the first run was 0.06 moles resulting in glycidol conversion of 60 mole percent and a vinyl glycidyl ether selectivity of 84 mole percent. A second reaction was performed with the same conditions except the amount of mercuric acetate was reduced to 0.03 moles resulting in conversion of 43 percent and selectivity of 100 percent.

EXAMPLE VI

Using 0.06 moles of mercuric acetate, 0.3 moles glycidol dissolved in 230 milliliters of benzonitrile at a methyl vinyl ether feed rate of 14.5 liters per hour, the following conversion and selectivities were obtained after 2 hours at the following temperatures:

At a temperature of 60° C. a conversion of 55 percent and selectivity of 88 percent were obtained. At a temperature of 80° C. a conversion of 61 mole percent and selectivity of 75 percent were obtained. At a temperature of 100° C. a conversion of 67 percent and a selectivity of 68 percent were obtained.

EXAMPLE VII

At a temperature of 60° C. methyl vinyl ether was fed into a solution of 0.06 moles mercuric acetate and 0.3 moles glycidol in 200 milliliters of benzonitrile at the following rates, resulting in the following conversions and selectivities. At a methyl vinyl ether feed rate of 14.5, 32.6, 38.7 and 51.7 liters per hour in separate experiments each for b 2 hours, the conversions obtained were 55, 69, 71 and 82 respectively, while the selectivities were 88, 68, 66 and 59 respectively. The run at the 14.5 liters per hour feed rate differed from the other runs in that 230 milliliters of benzonitrile solvent were used.

Variations of the above should be apparent to those skilled in the art without departing from the spirit and scope of the inventions as herein described.

We claim:

1. A process for producing vinyl glycidyl ether comprising passing methyl vinyl ether or ethyl vinyl ether through a solution of a mercuric salt catalyst and glycidol in a high boiling solvent selected from the group consisting of benzonitrile, adiponitrile, t-butyl toluene, and diglyme at atmospheric or superatmospheric pressure.

2. The process of claim 1 wherein the temperature is between about 25° C. and about 150° C.

3. The process of claim 1 wherein the solvent is benzonitrile.

4. The process of claim 1 wherein the molar ratio of mercuric salt catalyst to glycidol is from about 0.05 to about 0.5.

5. The process of claim 1 wherein the catalyst is mercuric acetate.

6. The process of claim 1 wherein an inert gas is continuously passed through the reaction mixture at a rate of up to 40 liters of gas per hour per liter of solvent.

7. The process of claim 1 wherein the pressure is from 1 to 5 atmospheres.

* * * * *